United States Patent

Hollenbeck et al.

[11] Patent Number: 6,144,131
[45] Date of Patent: Nov. 7, 2000

[54] DYNAMOELECTRIC MACHINE ROTOR HAVING INTERLEAVED LAMINATIONS AND METHOD FOR FORMING

[75] Inventors: Robert K. Hollenbeck, Fort Wayne, Ind.; Erik C. Ringberg, Taylors, S.C.; K.M.K. Genghis Khan, Niskayuna, N.Y.; Robert V. Zigler, Ft. Wayne; Tariq M. Alkhairy, Ft. Wayne, both of Ind.

[73] Assignee: General Electric Company, Schenectady, N.Y.

[21] Appl. No.: 09/035,632

[22] Filed: Mar. 4, 1998

Related U.S. Application Data

[63] Continuation of application No. 08/474,179, Jun. 7, 1995, abandoned.

[51] Int. Cl.$^7$ .............................. H02K 1/25; H02K 15/16
[52] U.S. Cl. ................................. 310/156; 310/216
[58] Field of Search .................... 310/216, 218, 310/156, 51

[56] References Cited

U.S. PATENT DOCUMENTS

| | | | |
|---|---|---|---|
| 1,993,825 | 3/1935 | Bohli et al. | 171/252 |
| 2,320,721 | 6/1943 | Ericsom | 74/574 |
| 2,636,399 | 4/1953 | O'Connor | 74/574 |
| 3,173,514 | 3/1965 | Tiedemann | 188/1 |
| 3,264,695 | 8/1966 | Summers et al. | 22/200.5 |
| 3,320,454 | 5/1967 | Kober | 310/268 |
| 3,417,272 | 12/1968 | Hoy | 310/261 |
| 3,428,837 | 2/1969 | Morreale et al. | 310/49 |
| 3,456,139 | 7/1969 | Newell | 310/49 |
| 3,483,407 | 12/1969 | Frohmuller et al. | 310/51 |
| 3,508,095 | 4/1970 | Knudson et al. | 310/156 |
| 3,512,612 | 5/1970 | Bragg et al. | 188/1 |
| 3,545,301 | 12/1970 | Ritcher | 74/574 |
| 3,552,230 | 1/1971 | McLean | 74/574 |
| 3,586,942 | 6/1971 | McMahan | 318/254 |
| 3,670,593 | 6/1972 | Troyer | 74/574 |
| 3,790,831 | 2/1974 | Morreale | 310/74 |
| 3,860,843 | 1/1975 | Kawasaki et al. | 310/67 |

(List continued on next page.)

FOREIGN PATENT DOCUMENTS

| | | | |
|---|---|---|---|
| 0 106 383 A1 | 9/1983 | European Pat. Off. | |
| 0 286 905 A1 | 3/1988 | European Pat. Off. | |
| 0 413 183 A1 | 7/1990 | European Pat. Off. | |
| JIS-B-0153 | of 0000 | Japan. | |
| 58-222766 | 12/1983 | Japan. | |
| 61-94548 | 5/1986 | Japan. | |
| 2-119544 | 5/1990 | Japan | 310/156 |
| 4-83590 | 4/1992 | Japan. | |
| 4-181973 | 7/1992 | Japan. | |
| 5-191936 | 7/1993 | Japan | 310/156 |
| 5-304751 | 11/1993 | Japan | 310/156 |
| 7-284237 | 10/1995 | Japan | 310/156 |
| WO 91/10277 | 7/1991 | WIPO. | |
| WO 94/05075 | 3/1994 | WIPO | 310/156 |

OTHER PUBLICATIONS

Helmut Gierse, "Simodrive: Trendsetting Drive Systems for Machine tools and Robots", 2466 Siemens Power Engineering & Automation, May/Jun. 1986, vol. 8, No. 3, pp. 147–149.

Primary Examiner—Nestor Ramirez
Assistant Examiner—Karl E. Imayoshi Tamai
Attorney, Agent, or Firm—Senniger, Powers, Leavitt & Roedel Damian Wasserbauer

[57] ABSTRACT

A dynamoelectric machine having a permanent magnet rotor construction which contains the permanent magnets while inhibiting flux leakage. The invention further permits rapid, substantially conventional manufacturing techniques to be employed in the formation of rotor laminations used to build the rotors. Flux leakage and formation of reluctance components are inhibited either within the individual rotor laminations or along the length of the rotor by interleaving rotor lamination of different types. The rotor may further be constructed to absorb vibrations within the rotor core and insulate the rotor shaft. The rotor may be still further be constructed for counterbalancing the unbalance of a shaft on which the rotor is mounted.

15 Claims, 5 Drawing Sheets

6,144,131

U.S. PATENT DOCUMENTS

| Patent No. | Date | Inventor | Class |
|---|---|---|---|
| 3,887,826 | 6/1975 | Apostoleris | 310/43 |
| 3,978,355 | 8/1976 | Hofert et al. | 310/74 |
| 4,049,985 | 9/1977 | Sudler | 310/49 R |
| 4,053,801 | 10/1977 | Ray et al. | 310/216 |
| 4,103,760 | 8/1978 | Yang | 188/1 B |
| 4,137,884 | 2/1979 | Odazima et al. | 123/149 D |
| 4,144,469 | 3/1979 | Miyashita et al. | 310/156 |
| 4,200,003 | 4/1980 | Miller | 74/574 |
| 4,322,648 | 3/1982 | Ray et al. | 310/156 |
| 4,324,996 | 4/1982 | Adelski et al. | 310/156 |
| 4,332,079 | 6/1982 | Silver | 29/598 |
| 4,336,649 | 6/1982 | Glaser | 29/598 |
| 4,341,969 | 7/1982 | Sievert | 310/154 |
| 4,354,126 | 10/1982 | Yates | 310/156 |
| 4,358,697 | 11/1982 | Liu et al. | 310/156 |
| 4,385,250 | 5/1983 | Welburn | 310/162 |
| 4,393,319 | 7/1983 | Bock | 310/80 |
| 4,403,161 | 9/1983 | Miyashita et al. | 310/156 |
| 4,403,401 | 9/1983 | Rosenberry | 29/596 |
| 4,405,873 | 9/1983 | Nondahl | 310/598 |
| 4,407,395 | 10/1983 | Suozzo | 188/134 |
| 4,424,463 | 1/1984 | Musil | 310/49 R |
| 4,434,546 | 3/1984 | Hershberger | 310/598 |
| 4,469,970 | 9/1984 | Neumann | 310/156 |
| 4,471,248 | 9/1984 | Smetana | 310/51 |
| 4,472,650 | 9/1984 | Advolotkin et al. | 310/156 |
| 4,476,408 | 10/1984 | Honsinger | 310/156 |
| 4,477,744 | 10/1984 | Gerber | 310/156 |
| 4,486,679 | 12/1984 | Jones | 310/156 |
| 4,504,755 | 3/1985 | Semones et al. | 310/156 |
| 4,525,925 | 7/1985 | Jones | 29/598 |
| 4,563,605 | 1/1986 | Gerber | 310/74 |
| 4,563,622 | 1/1986 | Deavers et al. | 318/254 |
| 4,568,846 | 2/1986 | Jones | 29/598 |
| 4,570,333 | 2/1986 | Jones | 29/598 |
| 4,616,151 | 10/1986 | Pryjmak | 310/216 |
| 4,617,484 | 10/1986 | Buijsen | 310/51 |
| 4,618,792 | 10/1986 | Yates | 310/156 |
| 4,629,916 | 12/1986 | Oudet | 310/49 R |
| 4,639,627 | 1/1987 | Takekoshi et al. | 310/156 |
| 4,642,502 | 2/1987 | Carpenter et al. | 310/156 |
| 4,672,253 | 6/1987 | Tajima et al. | 310/269 |
| 4,692,645 | 9/1987 | Gotou | 310/184 |
| 4,692,646 | 9/1987 | Gotou | 310/184 |
| 4,700,098 | 10/1987 | Kawashima | 310/186 |
| 4,703,243 | 10/1987 | Ettelman et al. | 318/696 |
| 4,713,569 | 12/1987 | Schwartz | 310/152 |
| 4,739,201 | 4/1988 | Brigham et al. | 310/49 R |
| 4,739,203 | 4/1988 | Miyao et al. | 310/67 R |
| 4,742,258 | 5/1988 | Earle et al. | 310/156 |
| 4,742,259 | 5/1988 | Schaefer et al. | 310/156 |
| 4,748,359 | 5/1988 | Yahara et al. | 310/156 |
| 4,755,698 | 7/1988 | Frister et al. | 310/51 |
| 4,761,576 | 8/1988 | Savage | 310/51 |
| 4,782,260 | 11/1988 | Gandhi et al. | 310/216 |
| 4,788,465 | 11/1988 | Hetrich | 310/269 |
| 4,795,936 | 1/1989 | Crosetto et al. | 310/156 |
| 4,800,306 | 1/1989 | Oberto | 310/51 |
| 4,825,983 | 5/1989 | Nakanishi | 188/378 |
| 4,833,353 | 5/1989 | Hansen | 310/51 |
| 4,841,186 | 6/1989 | Feigel et al. | 310/156 |
| 4,845,837 | 7/1989 | Lloyd | 29/598 |
| 4,864,175 | 9/1989 | Rossi | 310/156 |
| 4,908,537 | 3/1990 | Sismour, Jr. | 310/51 |
| 4,910,861 | 3/1990 | Dohogne | 29/598 |
| 4,916,346 | 4/1990 | Kilman | 310/216 |
| 4,918,831 | 4/1990 | Kilman | 29/598 |
| 4,922,152 | 5/1990 | Gleghorn et al. | 310/156 |
| 4,938,325 | 7/1990 | Nakagawa | 188/378 |
| 4,939,398 | 7/1990 | Lloyd | 310/156 |
| 4,963,804 | 10/1990 | Geiger | 318/460 |
| 4,973,871 | 11/1990 | Dohogne | 310/154 |
| 4,977,344 | 12/1990 | Obradovic | 310/217 |
| 4,987,330 | 1/1991 | Murphy et al. | 310/217 |
| 4,998,032 | 3/1991 | Burgbacher | 310/51 |
| 5,005,281 | 4/1991 | Burns | 29/596 |
| 5,010,266 | 4/1991 | Uchida | 310/156 |
| 5,023,502 | 6/1991 | Johnson | 310/261 |
| 5,043,613 | 8/1991 | Kurata et al. | 310/49 R |
| 5,045,740 | 9/1991 | Hishinuma | 310/156 |
| 5,053,666 | 10/1991 | Kliman et al. | 310/261 |
| 5,086,245 | 2/1992 | Sieja et al. | 310/216 |
| 5,089,730 | 2/1992 | O'Connor et al. | 310/51 |
| 5,097,166 | 3/1992 | Mikulic | 310/156 |
| 5,105,113 | 4/1992 | Ishikura et al. | 310/154 |
| 5,109,171 | 4/1992 | Schmider | 310/51 |
| 5,111,096 | 5/1992 | Horst | 310/168 |
| 5,113,104 | 5/1992 | Blaettner et al. | 310/90 |
| 5,113,105 | 5/1992 | Ikegami et al. | 310/233 |
| 5,117,553 | 6/1992 | Kliman | 29/598 |
| 5,118,978 | 6/1992 | Masumoto et al. | 310/153 |
| 5,124,607 | 6/1992 | Rieber et al. | 310/214 |
| 5,128,576 | 7/1992 | Obradovic | 310/217 |
| 5,138,207 | 8/1992 | Hilal et al. | 310/46 |
| 5,157,292 | 10/1992 | Morril | 310/42 |
| 5,157,294 | 10/1992 | Matsushita | 310/72 |
| 5,159,220 | 10/1992 | Kliman | 310/156 |
| 5,162,686 | 11/1992 | Royer | 310/156 |
| 5,175,461 | 12/1992 | Zigler et al. | 310/156 |
| 5,177,390 | 1/1993 | Van Maaren | 310/183 |
| 5,187,400 | 2/1993 | Kurata | 310/49 R |
| 5,204,569 | 4/1993 | Hino et al. | 310/154 |
| 5,214,323 | 5/1993 | Ueda et al. | 310/12 |
| 5,237,737 | 8/1993 | Zigler et al. | 29/598 |
| 5,250,867 | 10/1993 | Gizaw | 310/179 |
| 5,258,678 | 11/1993 | Futami | 310/156 |
| 5,260,620 | 11/1993 | Morill | 310/185 |
| 5,266,859 | 11/1993 | Stanley | 310/216 |
| 5,283,469 | 2/1994 | Forbes et al. | 290/1 C |
| 5,300,845 | 4/1994 | Fanning et al. | 310/217 |
| 5,306,123 | 4/1994 | Day et al. | 417/423.7 |
| 5,363,004 | 11/1994 | Futami et al. | 310/156 |
| 5,369,325 | 11/1994 | Nagate et al. | 310/156 |
| 5,402,024 | 3/1995 | Watanabe et al. | 310/156 |
| 5,420,471 | 5/1995 | Yun | 310/216 |
| 5,463,262 | 10/1995 | Uchida | 310/156 |
| 5,469,349 | 11/1995 | Marinus | 363/21 |
| 5,475,276 | 12/1995 | Shiga et al. | 310/154 |
| 5,497,039 | 3/1996 | Blaettner et al. | 310/51 |
| 5,506,458 | 4/1996 | Pace et al. | 310/67 R |
| 5,508,576 | 4/1996 | Nagate et al. | 310/156 |
| 5,523,634 | 6/1996 | Takahashi et al. | 310/49 A |
| 5,525,852 | 6/1996 | Fanning et al. | 310/217 |
| 5,578,878 | 11/1996 | Hall | 310/51 |
| 5,604,388 | 2/1997 | Baker et al. | 310/51 |
| 5,610,464 | 3/1997 | Asano et al. | 310/156 |
| 5,635,778 | 6/1997 | Fujita et al. | 310/51 |

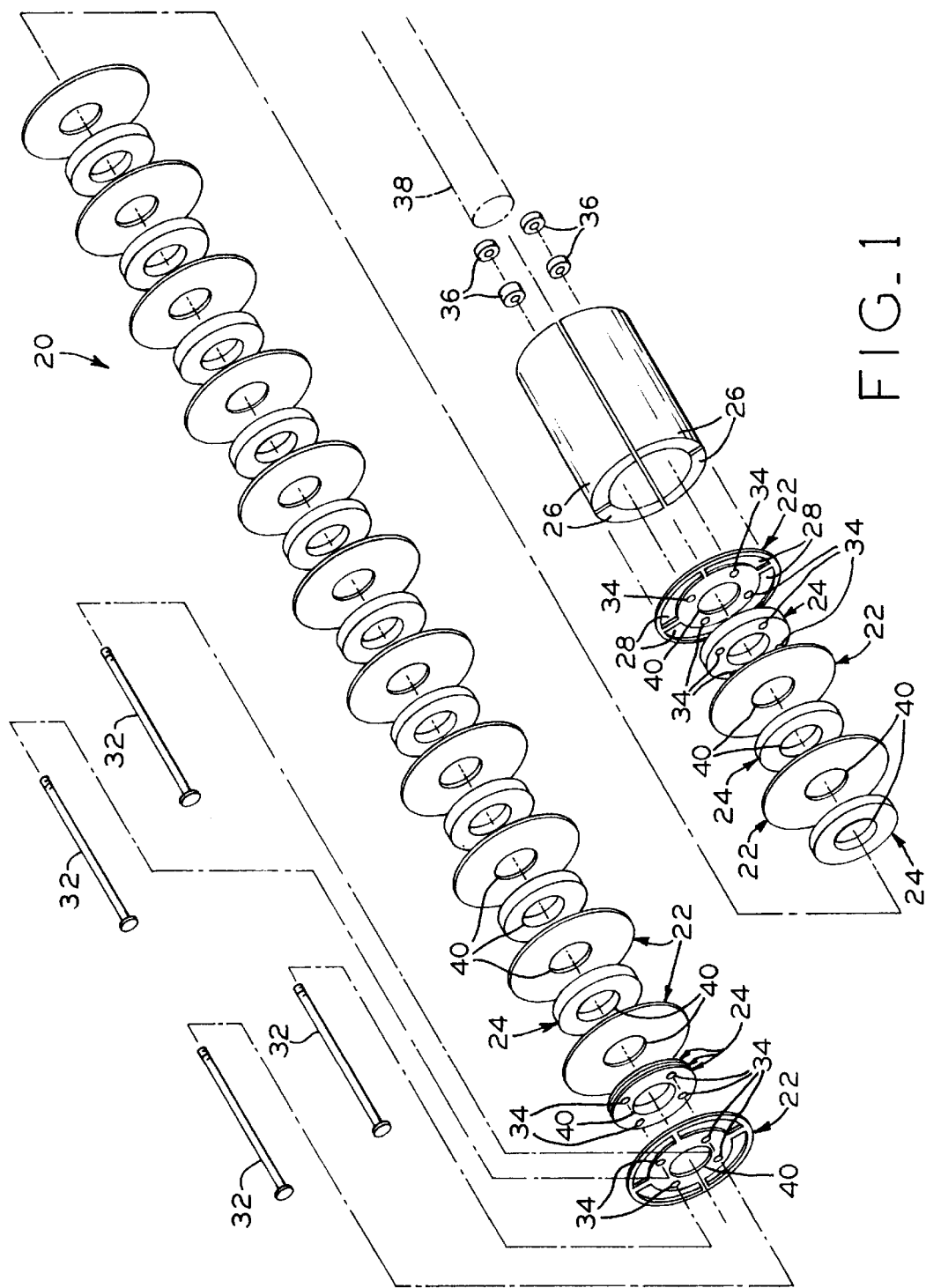

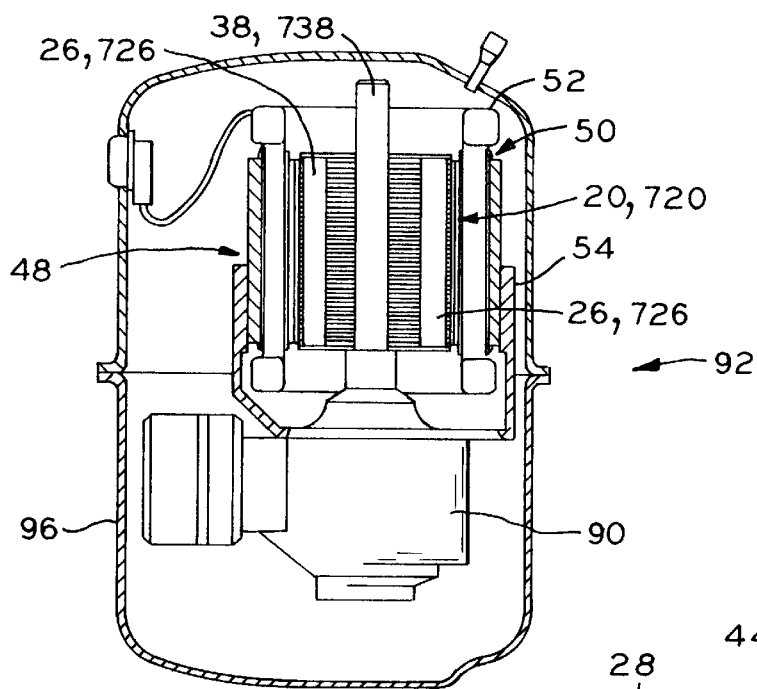
FIG_2
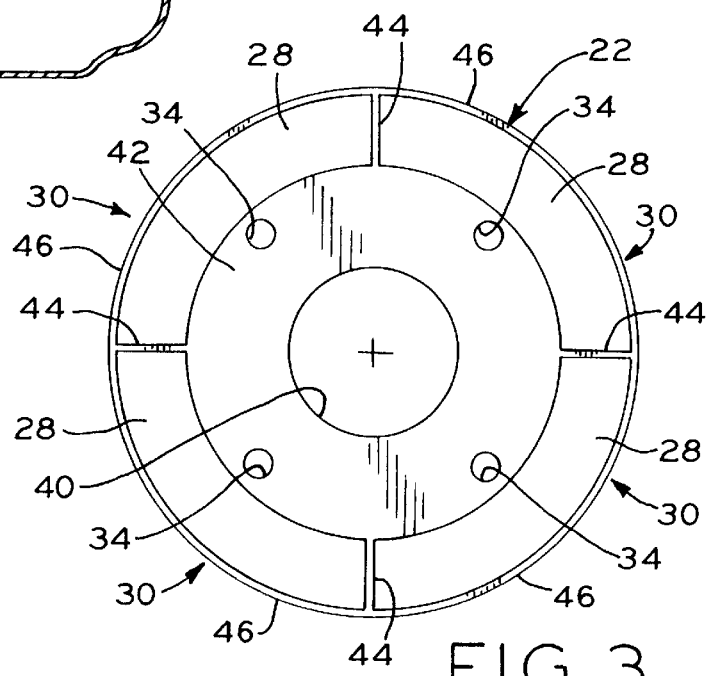
FIG_3
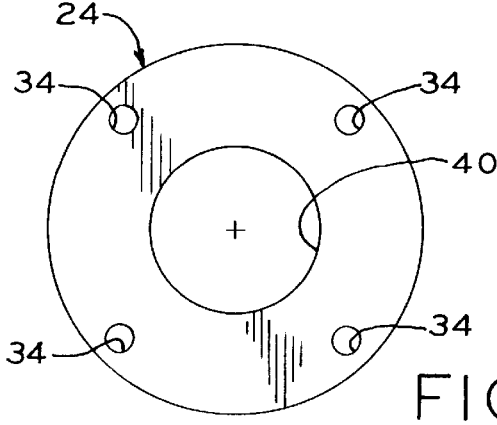
FIG_4

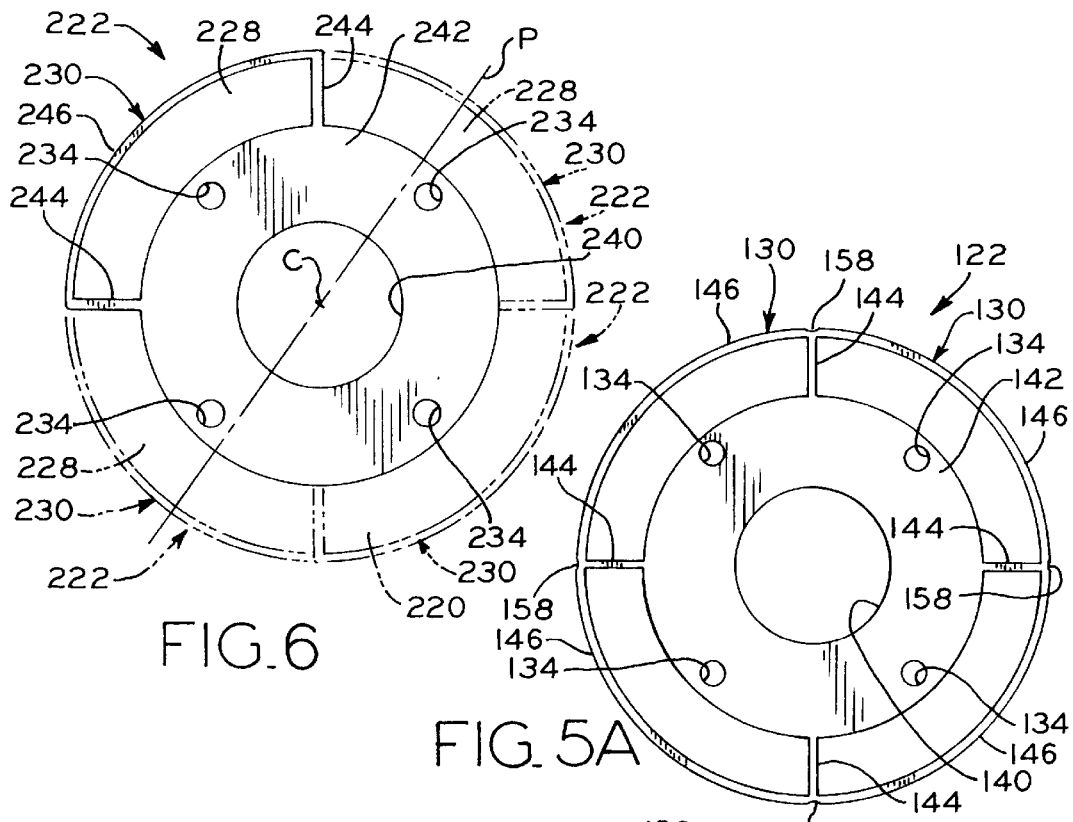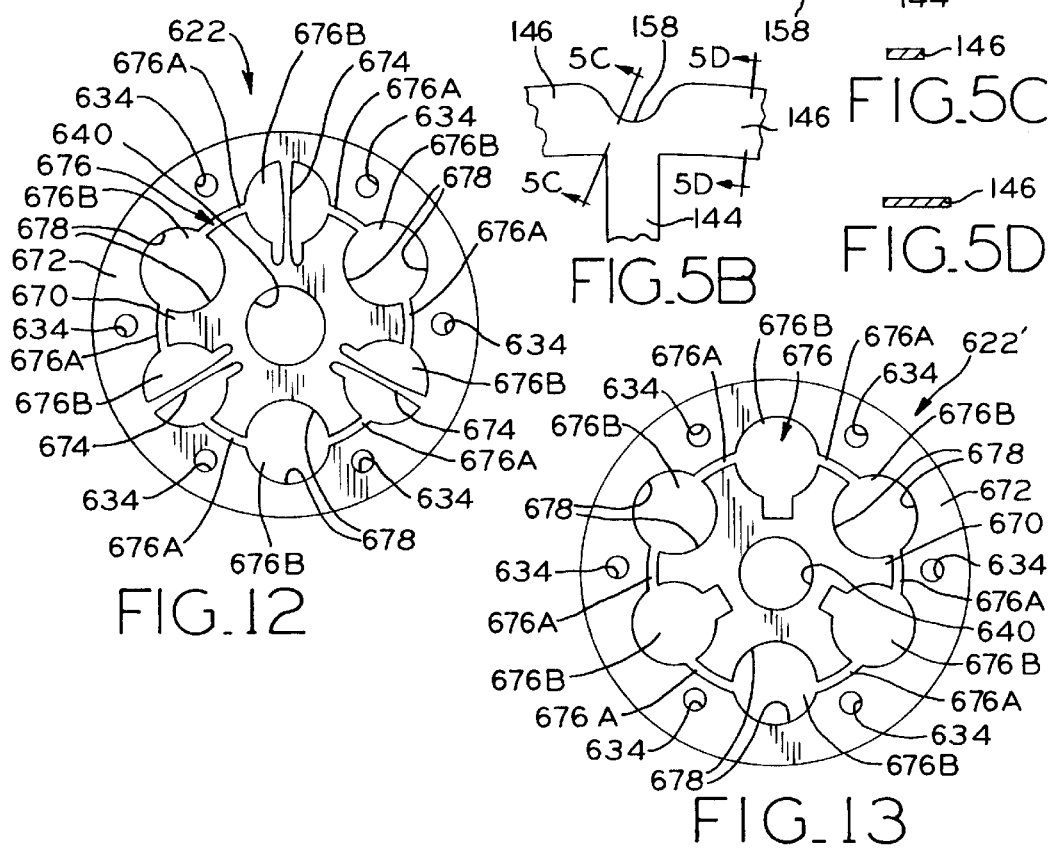

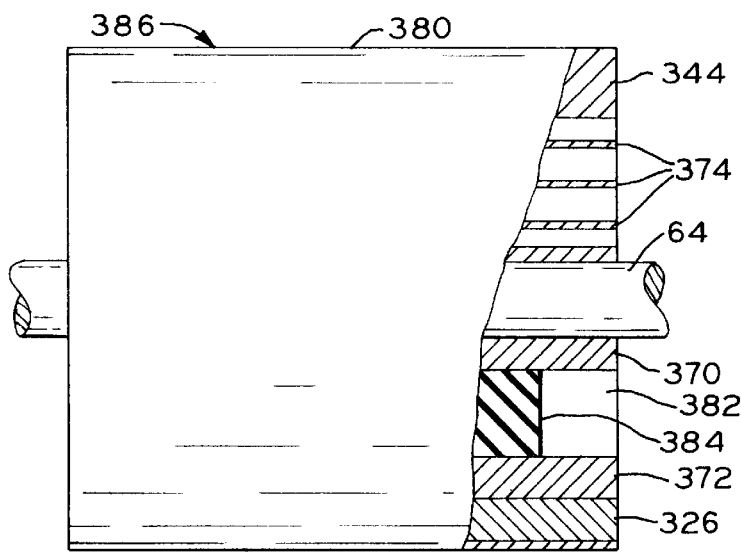
FIG. 9
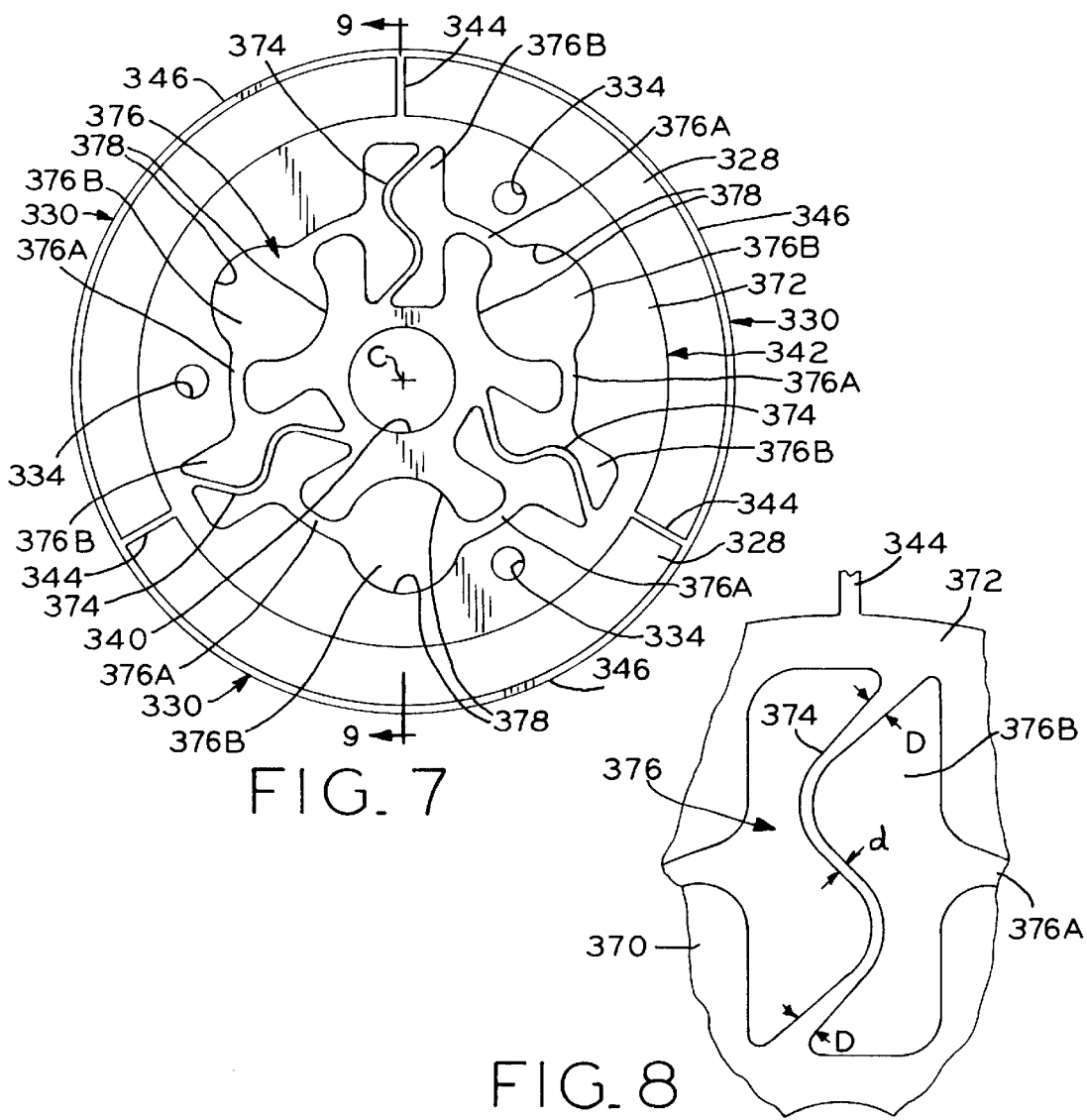
FIG. 7
FIG. 8

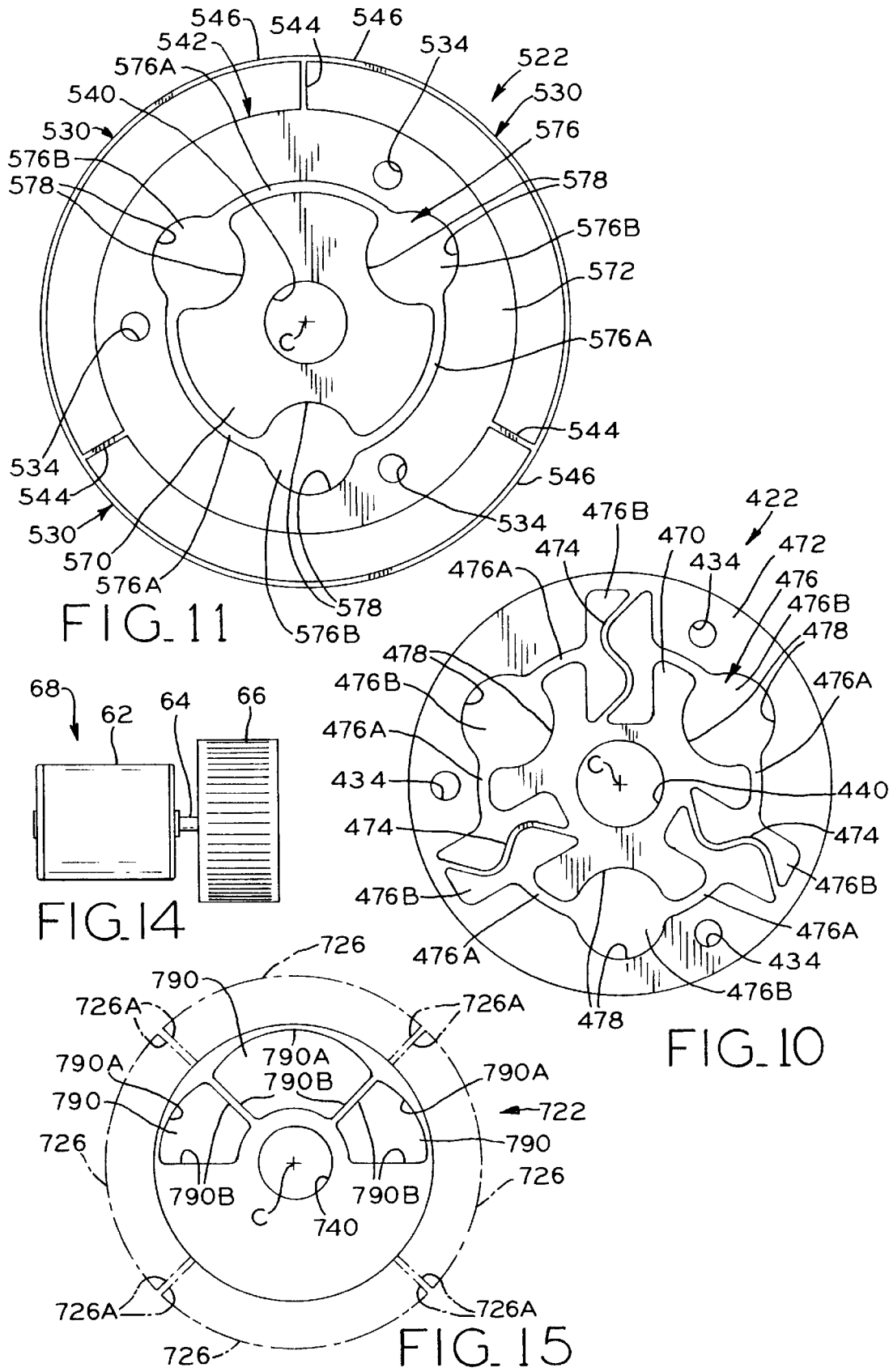

DYNAMOELECTRIC MACHINE ROTOR HAVING INTERLEAVED LAMINATIONS AND METHOD FOR FORMING

This is a continuation of U.S. application Ser. No. 08/474,179 (abandoned), filed Jun. 7, 1995.

BACKGROUND OF THE INVENTION

This invention relates generally to dynamoelectric machines and more particularly to rotors and rotor laminations for use in a dynamoelectric machine.

Rotors for dynamoelectric machines of the type having permanent magnets mounted on the outer surface of the rotor often require containment structures to prevent the magnets from being thrown off the rotor by centrifugal force at the operating speed of the dynamoelectric machine. Presently used forms of containment include non-magnetic structures (e.g., stainless steel sleeves, wire wraps, glass wraps and plastic over-molding) mounted or formed on the outer surface of the rotor, or holes formed in the rotor itself which receive the permanent magnets. Use of non-magnetic containment structures requires substantial additional manufacturing steps beyond stamping rotor laminations and stacking them to form a rotor core. The structure must be attached to or formed on the rotor core after it comes out of the forming die. This additional step, as well as the additional material required for the containment structure, significantly add to the cost of producing the motor. Moreover, in the case of stainless steel containment sleeves extending unbroken along the length of the rotor core, substantial eddy currents are conducted producing corresponding losses in the dynamoelectric machine.

Mounting the permanent magnets within the rotor core, which is made of a magnetic material, creates the problem of leakage of magnetic flux from the permanent magnet, causing a corresponding loss in efficiency of the dynamoelectric machine. Flux leakage occurs when lines of flux from one pole of the magnet pass through rotor material located between the permanent magnet and stator to the other pole of the permanent magnet without crossing the air gap and passing through the stator. In applications where the motor is running frequently, the motor inefficiency constitutes a substantial portion of overall inefficiency of the apparatus driven by the motor, flux leakage losses are of significant concern. Another source of efficiency loss for dynamoelectric machines in which permanent magnets are held within the rotor cores is reluctance components caused by having a relative large amount of magnetic rotor material between the permanent magnet and the stator which varies in width across the radially outer face of the permanent magnet.

Dynamoelectric machines can experience vibrations caused by torque pulsations. The problem is particularly acute in the context of variable speed motors which are operated over a wide range of speeds. The frequency of the vibrations changes with the speed of the motor, and the vibrations are transmitted from the rotor to the rotor shaft, and thence to the apparatus connected to the shaft. When such motors are used, for instance, in a blower unit with a squirrel cage fan in a heating and cooling system, the vibrations caused by torque pulsations and transmitted from the rotor to the fan through the connecting shaft cause the fan (or other components of the blower unit) to ring when the frequency of the pulsations corresponds to a natural vibration frequency of the fan. The audible noise produced by the blower unit is highly undesirable. The problem is not limited to permanent magnet rotors, but also occurs in other types of rotors such as switch reluctance rotors.

It is known to dampen the vibration in the rotor core by introduction of a rubber vibration absorber between the rotor (or part of the rotor) and the rotor shaft. More specifically, it is known to separate the rotor core into generally annular inner and outer members connected together solely by two elastomeric rings. The elastomeric rings absorb and dampen the vibrations caused by torque pulsations. However, it is difficult to dimension the rings closely enough to position the outer surface of the rotor in closely spaced relation with the stator in the stator bore. Moreover, the shape of the elastomeric ring can change over time as a result of the vibrations so that the concentricity between the inner and outer members changes, as does the spacing between the outer periphery of the rotor and stator.

In some applications, a dynamoelectric machine is connected to a shaft which is out of balance in rotation about its axis. For example a compressor shaft may be out of balance in rotation because of cams on the shaft used to drive pistons in the compressor. The amount by which the shaft is out of balance is readily determined and can be counterbalanced. Heretofore, such counterbalancing has been carried out by application of counterweights to the rotor core. The counterweights are an additional material cost, and their application to the rotor core is an additional manufacturing step which increases the cost of producing the dynamoelectric machine.

SUMMARY OF THE INVENTION

Among the several objects and features of the invention may be noted the provision of a rotor lamination which facilitates retention of a permanent magnet on a rotor core formed by a stack of the rotor laminations; the provision of such a rotor lamination which inhibits flux leakage in the rotor core; the provision of such a rotor lamination which inhibits the creation of reluctance components in the rotor core; the provision of such a rotor lamination which is readily produced in a rotor core forming die without the need for further machining to produce its flux leakage inhibiting qualities; the provision of such a rotor lamination having magnet retaining formations which are sufficiently strong to hold the permanent magnets on the rotor at all operating speeds of the dynamoelectric machine in which it is incorporated; the provision of such a rotor lamination which can be accurately and efficiently produced in mass quantities.

Further among the several objects and features of the invention may be noted the provision of rotor laminations of two types which are capable of being interleaved in a stack to form a rotor core; the provision of such rotor laminations which facilitate reduction of flux leakage and reluctance components over the length of the rotor core; the provision of such rotor laminations which can be arranged in a stack to form a rotor core which will counterbalance an unbalanced shaft to which the rotor core is to be connected.

And still further among the several objects and features of the present invention may be noted the provision of rotor laminations capable of being stacked to form a rotor core which is used in absorbing vibrations; the provision of such rotor laminations which substantially isolate the rotor shaft from vibrations within the rotor core; the provision of such rotor laminations which maintain concentricity in the rotor core between the center of the core and the outer periphery of the rotor core, and a close-spacing between the outer periphery and a stator.

It is also among the several objects and features of the present invention to provide a rotor which substantially isolates its shaft from vibrations caused by torque pulsations; the provision of such a rotor which can be constructed in a range of sizes using the same vibration absorbing component; the provision of such a rotor which holds the concentricity of the axis of its shaft with the outer surface of its rotor core; the provision of such a rotor in which the vibration absorbing component is not a structural member of the rotor.

Further among the several objects and features of the present invention may be noted the provision of a rotor which retains permanent magnets within its rotor core; and the provision of such a rotor which has limited flux leakage and low occurrence of reluctance components within its rotor core.

Still further among the several objects and features of the present invention may be noted the provision of a dynamoelectric machine having the advantages discussed above for the rotor laminations and rotor.

Finally, among the several objects and features of this invention may be noted the provision of methods for forming dynamoelectric machines including formation of the rotor laminations and rotor cores described above.

Generally, apparatus comprising a rotor lamination including a disk portion having a generally central shaft-receiving opening therein. A permanent magnet retaining formation includes ribs extending radially outwardly from the periphery of the disk portion at spaced-apart locations on the disk portion and a bridge extending along an arc from the distal end of one of the ribs to the distal end of another of the ribs and connecting the ribs. The bridge, the ribs, and the portion of the periphery of the disk portion between the ribs define a hole for receiving a permanent magnet. A notch in the bridge of the permanent magnet retaining formation is sized such that the cross sectional area of the bridge at the notch is smaller than the cross sectional area of the bridge at any other location whereby when the rotor lamination is incorporated in a rotor core containing a permanent magnet extending through the permanent magnet retaining formation a flux saturation point is achieved at the notch to inhibit flux leakage through the bridge.

In another aspect of the present invention, apparatus comprising rotor laminations of a magnetically permeable material are arranged in a stack for forming a rotor core. The rotor laminations include first rotor laminations each comprising a disk portion and a permanent magnet retaining formation. Second rotor laminations each have a central shaft-receiving opening therein generally aligned with the shaft-receiving openings of the first rotor laminations in the rotor core. The second rotor laminations have maximum diametrical dimensions which are less than the maximum diametrical dimensions of the first rotor laminations in the rotor core. The first rotor laminations and second rotor laminations are arranged in the stack for use in inhibiting flux leakage along the length of the permanent magnet.

In yet another aspect of the present invention, apparatus comprises a rotor lamination including a disk portion and a permanent magnet retaining formation. A portion of the periphery of the disk portion of the rotor lamination are open in a radial direction such that a radially extending plane perpendicular to the rotor lamination and passing through said open portion of the periphery of the disk portion intersects no rotor lamination material radially outwardly of the periphery of the disk portion.

In still another aspect of the present invention, apparatus comprises a rotor lamination including a radially inner member having a generally central shaft-receiving opening therein, and a radially outer member generally surrounding the radially inner member. Elongate segments extending between and connecting the radially inner and outer members of the rotor laminations are sized for resiliently flexing to permit relative movement between the radially inner member and radially outer member of the rotor lamination.

Methods of the present invention generally comprise removing material or stamping steps to form rotor laminations of the type described above.

Other objects and features of the present invention will be in part apparent and in part pointed out hereinafter.

BRIEF DESCRIPTION OF THE DRAWINGS

FIG. 1 is an exploded perspective of a rotor of the present invention having an interleaved rotor core construction;

FIG. 2 is an cross section of a hermetic compressor having a compressor motor of the present invention;

FIG. 3 is a plan view of a first rotor lamination of a first embodiment having magnet retaining formations;

FIG. 4 is a plan view of a second rotor lamination of the first embodiment which is interleaved with the first lamination in FIG. 1;

FIG. 5A is a plan view of a rotor lamination of a second embodiment having a permanent magnet retaining formation which is notched to reduce flux leakage through the permanent magnet retaining formation;

FIG. 5B is an enlarged fragmentary plan view the rotor lamination of FIG. 5A showing a notch;

FIG. 5C is a section taken in a plane including line 5C—5C of FIG. 5B;

FIG. 5D is a section taken in a plane including line 5D—5D of FIG. 5B;

FIG. 6 is a plan view of a rotor lamination of a third embodiment having a single permanent magnet retaining formation, other rotor laminations of the same type being shown in phantom stacked under the rotor lamination;

FIG. 7 is a plan view of a vibration dampening rotor lamination of a fourth embodiment;

FIG. 8 is an enlarged fragmentary view of a rotor lamination of the fourth embodiment;

FIG. 9 is a schematic elevation of a rotor formed by stacking rotor laminations of the fourth embodiment, with parts broken away to show an elastomeric insert within the core;

FIG. 10 is a plan view of a vibration dampening rotor lamination of a fifth embodiment having no permanent magnet retaining formations;

FIG. 11 is a plan view of a vibration dampening rotor lamination of a sixth embodiment having no interconnection between radially inner and outer members of the lamination;

FIG. 12 is a plan view of a vibration dampening rotor lamination of a seventh embodiment;

FIG. 13 is a plan view of a vibration dampening rotor lamination of the seventh embodiment having all connection between inner and outer members of the lamination broken;

FIG. 14 is an elevation of a squirrel cage fan and motor unit; and

FIG. 15 is a counterbalance rotor lamination of an eighth embodiment.

Corresponding reference characters indicate corresponding parts throughout the several views of the drawings.

DETAILED DESCRIPTION OF THE PREFERRED EMBODIMENT

Referring now to the drawings, and in particular to FIGS. 1, 3 and 4, a rotor indicated generally at 20 is shown to comprise first rotor laminations and second rotor laminations (of a first embodiment) which are interleaved in a stack to form a rotor core. The first and second rotor laminations are indicated generally in the drawings by reference numerals 22 and 24, respectively. It is to be understood that the term "interleaved", as used herein, means that rotor laminations of different types are stacked together in one stack in any order, and is not limited to separating each rotor lamination 22 by three of the rotor laminations 24, as shown in FIG. 1. Four arcuate permanent magnets 26 are received through aligned openings 28 defined by permanent magnet retaining formations 30 (FIG. 3) on the first rotor laminations 22. Retention of the permanent magnets 26 by physically separate permanent magnet retaining formations 30 associated with the first laminations 22 substantially inhibits eddy currents in the rotor core. In the illustrated embodiment, the magnets 26 extend over an arc of slightly less than 90° and are held on the rotor core by the mechanical restraint of the permanent magnet retaining formations 30 and magnetic attraction to the magnetically permeable rotor lamination material. Four bolts 32 received through four corresponding aligned holes 34 in the first and second rotor laminations 22, 24 are secured by nuts 36 to hold the first and second rotor laminations in the rotor core together. However, it is to be understood that the first and second rotor laminations 22, 24 may be secured together in other ways and still fall within the scope of the present invention. A rotor shaft 38 (shown in phantom in FIG. 1) is received through aligned central shaft-receiving openings 40 of the first and second rotor laminations 22, 24 in the rotor core.

As shown in FIG. 3, the first rotor laminations 22 each include an annular disk portion 42 in which the central shaft-receiving opening 40 and the four bolt holes 34 are located. The permanent magnet retaining formations 30, of which there are four in the illustrated embodiment, are defined by four ribs 44 and four bridges 46 extending arcuately between the distal ends of adjacent ribs. The ribs 44 each extend radially outwardly from the periphery of the disk portion 42 at spaced-apart locations around the circumference of the disk portion, and each rib is shared by adjacent permanent magnet retaining formations 30. The bridges 46 are each thin and have a radially inner edge and a radially outer edge extending parallel to one another along an arc between adjacent ribs 44. In a dynamoelectric machine, reluctance components caused by the bridges 46 are substantially eliminated because of the small amount of material in the bridges and the substantial uniformity in width of each bridge over its length. As a result, a more inexpensive square wave controller (not shown) may be used for the dynamoelectric machine.

In the embodiment illustrated in FIG. 3, the permanent magnet retaining formations 30 encircle the disk portion of the first rotor lamination 22. However, permanent magnet formations may be spaced-apart around the circumference of disk portions of rotor laminations (not shown) and still fall within the scope of the present invention. In addition, it is to be understood that the number of permanent magnet retaining formations on a rotor lamination may be greater than or less than four.

In the rotor 20 shown in FIG. 1, it is not necessary, although it is within the scope of the invention, that the bridges 46 in the first rotor laminations 22 be sufficiently thin to create magnetic saturation points within the bridges. In the FIG. 1 embodiment, flux leakage and reluctance components are inhibited along the length of the rotor 20 by the presence of the second rotor laminations 24 (FIG. 4) which have maximum diametrical dimensions which are less than the maximum diametrical dimensions of the first rotor laminations 22. Preferably, the second rotor laminations 24 are substantially the same size as the disk portions 42 of the first rotor laminations 22. When the rotor 20 is assembled with a stator and other components to form a dynamoelectric machine (e.g., compressor motor indicated generally at 48 in FIG. 2), there will be no flux leakage from the permanent magnets 26 at locations in the rotor where the second rotor laminations 24 are present. The absence of flux leakage occurs because the second rotor laminations 24 have no material which is disposed between the permanent magnets 26 and the stator to draw lines of magnetic flux from the permanent magnets and away from the stator. Although flux leakage will occur from the permanent magnets 26 where they pass through the permanent magnet retaining formations 20 of the first rotor laminations 22, the effective flux leakage path for the entire rotor is reduced by the presence of the second rotor laminations 24.

The occurrence of the first rotor laminations 22 in the stack forming the rotor core is preferably limited to the extent permitted by the strength needed to hold the permanent magnets 26 on the rotor 20. For example, the first rotor laminations 22 may constitute no more than one in every four (FIG. 1) or five consecutive rotor laminations in the stack to further reduce the effective flux leakage path.

In the preferred embodiment, a dynamoelectric machine such the compressor motor 48 shown in FIG. 2, is formed by stamping first rotor laminations 22 from a web of generally thin, magnetically permeable material (not shown), and similarly forming second rotor laminations 24 by stamping them out from the same web of material. The first and second rotor lamination 22, 24 are then stacked in a predetermined order to form a rotor core with the central shaft-receiving openings 40 of the first and second rotor laminations generally in alignment and corresponding permanent magnet retaining formation openings 28 on the first rotor laminations 22 in registration.

The rotor laminations 22, 24 making up the rotor core are secured together by the bolts 32, and the permanent magnets 26 are inserted through respective aligned openings 28 of the first rotor laminations. It is to be understood that the rotor laminations 22, 24 may be secured together in other ways than by bolts 32 and still fall within the scope of the present invention. The rotor shaft 28 (FIG. 1) is mounted in the passage formed by the aligned central shaft-receiving openings 28 of the first rotor laminations to form the rotor 20. The rotor 20 is assembled in a central bore of a stator (e.g., stator indicated generally at 50 in FIG. 2) having windings 52 which are selectively energizable for magnetically interacting with the permanent magnets 26 on the rotor. The rotor/stator unit is mounted on a frame (e.g., frame 54 of the compressor motor 48) and any necessary wiring or other finishing steps are carried out to complete the motor. The order of assembly of the motor may be varied from the aforementioned and still fall within the scope of the present invention.

Referring now to FIGS. 5A–5D, rotor laminations of a second embodiment (indicated generally at 122) may be seen as being substantially the same as the first rotor laminations 22 of the first embodiment, except for the presence of notches 158 (FIG. 5B) disposed generally in registration with the distal end of each rib 144 of the permanent magnet retaining formations 130. Corresponding parts of the second and subsequent embodiments of the rotor laminations of the present invention will be designated by the same reference numeral as the first or subsequent embodiment, with the addition of "100" or a corresponding multiple thereof. A rotor core of the second embodiment (not shown) is preferably made by stacking exclusively the rotor laminations 122 of the second embodiment. No reduced diameter rotor laminations (i.e., the second rotor laminations 24) need be used in the stack, although such second laminations could be used. Reduction of flux leakage and inhibiting of the formation of reluctance components is achieved in each rotor lamination 122 by the presence of the notches 158.

The rotor laminations 122 are preferably formed using conventional stamping equipment which removes material from a web of generally thin, magnetically permeable stock material (not shown) to form a disk portion 142 having a generally central shaft-receiving opening 140. Additional stock material is removed to form a permanent magnet retaining formation 130 defined by the ribs 144 and bridges 146. The width of the bridges 146 (i.e., their dimension in a radial direction) prior to formation of the notches 158 is preferably sized sufficiently large so that it can be accurately formed using conventional, mass-production stamping methods. However, the width of the bridge 146 so formed is sufficiently large to conduct a significant amount of magnetic flux, so that if the rotor laminations 122 were incorporated into a rotor without formation of the notches 158, a significant flux leakage and loss of efficiency would occur.

As shown in FIG. 5B, the notches 158 are cut out of the bridges 146 at the intersection of adjacent bridges with the distal ends of the ribs 144, and open radially outwardly at an outer peripheral edge of the bridges. The width of each bridge 146 at the notch 158 is sized such that the cross sectional area of the bridge (FIG. 5C) is smaller than the cross sectional area of the bridge at any other location (illustrated in FIG. 5D). The width of the bridge 146 in the notch 158 is sufficiently small so that when the rotor lamination 122 is incorporated into the rotor, a magnetic saturation point is achieved in the bridge at the notch, substantially inhibiting flux leakage from the permanent magnets (not shown) caused by the presence of the bridge. The notch 158 may be formed within the same die which stamps the rotor lamination 122 from the stock material. In this way, higher motor efficiency is achieved without additional manufacturing steps, such as securing the permanent magnets to the rotor core using stainless steel sleeves, or turning a rotor core on a lathe to reduce bridge thickness. It is to be understood that the precise order of the formation of the disk portion 142, magnet retaining formation 130 and notch 158 in the rotor die may be other than described herein and still fall within the scope of the present invention.

A preferred form of a rotor lamination 222 of a third embodiment is shown in solid lines in FIG. 6 to comprise a disk portion 242 and a single magnet retaining formation 230 including two ribs 244 and a single bridge 246 extending between them. It is contemplated that a rotor lamination (not shown) of the third embodiment could have more than one a permanent magnet retaining formation, so long as a portion of the periphery of the disk portion is open in a radial direction such that a radially extending plane (seen edge on as line P in FIG. 6) perpendicular to the rotor lamination and passing through the open portion of the periphery intersects no rotor lamination material radially outwardly of the periphery of the disk portion. Thus, in the case where there are multiple permanent magnet retaining formations, the formations are circumferentially spaced around the periphery of the disk portion. The spacing between the permanent magnet retaining formations provides a gap in the rotor lamination where there will be no magnetic flux leakage or formation of reluctance components.

To form a rotor core from the rotor laminations 222 of the third embodiment, the rotor laminations are stacked so that the single permanent magnet retaining formation 230 is angularly offset from the permanent magnet retaining formations (shown in phantom in FIG. 6) of at least some of other substantially identical rotor laminations in the stack, and in registration with the permanent magnet retaining formation of at least one other rotor lamination in the stack. The openings 228 of the permanent magnet retaining formations 230 which are in registration define four passages in which permanent magnets, like the permanent magnets 26 shown in FIG. 1, are received. Over a substantial length of each permanent magnet there will be no magnetically permeable material located radially outwardly of the permanent magnet. Thus, when a rotor incorporating the rotor core is inserted into a stator bore (not shown), there is no rotor lamination material between the permanent magnet and the stator over a substantial length of each permanent magnet. Accordingly, the effective flux leakage path over the length of the rotor core is less than the width of the bridge 246 of the permanent magnet retaining formation 230.

It is envisioned a rotor core made up of rotor laminations 222 of the third embodiment can be formed in the rotor die by rotation of the rotor core forming stack about an axis extending through a center C of the shaft-receiving openings 240 of the rotor laminations in the stack and perpendicular to the plane of the rotor laminations in the stack. The rotation of the stack could occur between the addition of each new additional rotor lamination 222 to the stack, or after addition of a predetermined number of rotor laminations. The exact arrangement of the rotor laminations 222 in the stack will depend upon a balance struck between strength needed to hold each permanent magnet on the rotor core at the operating speeds of the motor and the desired efficiency of the motor.

Rotor laminations of the present invention for use in dampening vibrations in rotor core are the fourth through seventh embodiments of the present invention shown in FIGS. 7–13. These embodiments are constructed for use in building rotor cores which inhibit transmission of vibration, such as vibration caused by torque pulsations in a variable speed ECM blower motor 62, to a rotor shaft 64 connecting the motor to a squirrel cage fan 66 (FIG. 14). Such a blower unit (indicated generally by reference numeral 68) may be used in a heating and cooling system to force the heated or cooled air from the system.

As shown in FIGS. 7 and 8, a rotor lamination 322 of a fourth embodiment includes a disk portion 342 comprising a radially inner member 370 having a generally central shaft-receiving opening 340, a radially outer member 372 generally surrounding the radially inner member, and elongate segments 374 extending between and connecting the inner and outer members of the disk portion. Permanent magnet retaining formations 330 of substantially identical construction to the permanent magnet retaining formations 30, 130 of the rotor laminations 22, 122 of the first or second embodiments, include ribs 344 and bridges 346, are located on the periphery of the disk portion 342. It is to be understood that the vibration dampening rotor lamination 322 may have one or more angularly spaced magnet retaining formations (not shown, but similar to the permanent magnet retaining formation 230 of the rotor lamination 222 of the third embodiment), or no permanent magnet retaining magnet formations, as rotor lamination 422 of a fifth embodiment shown in FIG. 10, and still fall within the scope of the present invention. In absence of any permanent magnet retaining formations, permanent magnets (not shown) may be attached to the rotor core in a suitable manner, such as by gluing or by stainless steel sleeves. Of course the principles of the vibration isolating and dampening aspect of the present invention are applicable also to rotors (e.g., switch reluctance rotors) which do not use permanent magnets.

The elongate segments 374 are sized for resiliently flexing to permit relative movement between the radially outer member 372 and the radially inner member 370 of the rotor lamination 322. To facilitate flexion, the elongate segments 374 are curved along their lengths, and are narrower in transverse dimension away from their intersections with the inner and outer members 370, 372. As may be seen in FIG. 8, the transverse dimension D of the elongate segment 374 adjacent its intersections with the radially inner and outer members 370, 372, is greater than its transverse dimension d further away from the intersections with the outer and inner members. The elastic memory of the elongate segments 374 biases the radially outer member 372 of the disk portion 342 toward a position in which the outer periphery of the outer member is substantially concentric with the inner member 370 (i.e., with respect to the center C of the central shaft-receiving opening 340). The elongate segments 374 are sized and shaped so that the concentricity of the inner and outer members 370, 372 is substantially retained over the life of the electric motor (e.g., blower motor 62) in which the rotor laminations 322 are incorporated.

The radially inner and outer members 370, 372 define a generally annular opening (designated generally by reference numeral 376) broken into arcuate portions by the elongate segments 374 connecting the inner and outer members of the disk portion 342. The opening 376 extends along the inner periphery of the outer member 372 and the outer periphery of the inner member 370, and includes narrow portions 376A and wide portions 376B. Some of the wide portions 376B are defined by radially opposed, generally semi-circular cutouts 378 in the inner and outer members 370, 372, while the remainder contain the elongate segments 374.

Referring now to FIG. 9, a vibration dampening rotor core 380 is formed by stacking rotor laminations 322. For clarity, the rotor core has been schematically shown as being solid, although in fact it is made up of a plurality of the thin rotor laminations 322. Where the rotor core 380 has been broken away in FIG. 9, it is shown in cross-section which corresponds generally to a cross-section of the rotor lamination 322 taken in the plane including line 9—9 of FIG. 7. A vibration dampening rotor core (not shown) could also be constructed by stacking rotor laminations 422 (FIG. 10), or by interleaving rotor laminations 322 with vibration dampening rotor laminations of a sixth embodiment indicated generally at 522 in FIG. 11. It would also be possible to interleave rotor laminations 422 with rotor laminations (not shown) similar to the rotor lamination 522, but lacking the permanent magnet retaining formations 530. The rotor lamination 522 is preferably initially formed with its radially inner and outer members 570, 572 joined by connecting segments (not shown) which are later broken, such as after the rotor lamination is added to the stack. Use of rotor laminations 522 having no interconnection between the radially inner and outer members 570, 572, increases the overall flexibility of the rotor core. The inner and outer members 570, 572 of the rotor laminations 522 depend upon their connection to rotor laminations 322 having elongate segments 374 in the core for maintaining their generally concentric arrangement. The radially inner and outer members of the rotor laminations 522 also define an opening 576 between them including narrow portions 576A and wide portions 576B defined by radially opposing, generally semi-circular cutouts 578.

Whether a rotor core is formed by stacking exclusively the rotor laminations 322 or 422, or by interleaving rotor laminations 322 with rotor laminations 522, the wide portions (376B, 476B, 576B) of the openings of the vibration dampening rotor laminations which are defined by the radially opposed, semi-circular cutouts (378, 478, 578), are generally in registration with each other. As shown in FIG. 9, the wide portions 376B defined by cutouts 378 which are in registration with each other define vibration absorber receiving passages 382 (only one is shown) in which generally cylindrical, elastomeric inserts 384 (broadly "vibration absorbing means") are placed. The elastomeric inserts 384 may be standardized for use in vibration dampening rotor cores (not shown) having different stack heights. The inserts 384 may have a length selected to extend the full length of the rotor core having the shortest stack height, and still used in rotor cores of greater heights.

The rotor shaft 64 is received through the aligned central shaft-receiving openings 340 of the rotor laminations 322 in the rotor core 380, and the radially inner members 370 are rigidly connected to the shaft. Permanent magnets 326 are inserted through the aligned permanent magnet receiving formations 330 of the rotor laminations 322. A completed rotor 386 is assembled with a stator (not shown) by inserting the rotor into the stator bore, and the two are mounted on a supporting frame such as the housing of blower motor 62 (FIG. 14). Any necessary wiring and finishing assembly is carried out to produce the finished motor.

The various features of the rotor laminations (322, 422, 522) of the fourth, fifth and sixth embodiment, as described above, are preferably formed by removing material from a web of generally thin, magnetically permeable stock material such as by stamping in a rotor die.

In operation of the variable speed blower motor 62, the rotor core 380 will be subject to torque pulsations. If the rotor core in the motor were of conventional, rigid construction, the vibratory action caused by these pulsations would be transmitted by the rotor core with little attenuation to the rotor shaft 64, and ultimately to the squirrel cage fan 66 connected to the rotor shaft and other components of the blower motor 62. The vibrations will generally vary in frequency with the speed of the motor. When the vibrations occur at the natural frequency of the squirrel cage fan 66 or other component of the blower motor, it will ring producing undesirable noise. However, with the rotor core 380 of the present invention, the vibration introduced by torque pulsations causes the radially outer members 372 of the rotor laminations 322 in the core to vibrate as a result of the flexibility of the elongate segments 374. The vibrations of the outer members 372 are transmitted to the elastomeric inserts 384 in the rotor core 380, which absorb and dampen the vibrations, and substantially insulate the radially inner members 370 and the rotor shaft 64 from them. In this way, quiet operation of the blower unit 68 is maintained over its full range of speeds.

Because of the elastic memory of the elongate segments 374 of the rotor laminations 322, the rotor laminations will return to a configuration in which the inner and outer members 370, 372 of the rotor laminations in the rotor core 380 are generally concentric when vibratory motion in the rotor core ceases. The inner members 370 are rigidly attached to the rotor shaft 64, so the spacing between the outer surface of the rotor core 380 and the stator is thus accurately maintained. It is therefore possible to accurately maintain a close spacing between the outer periphery of the rotor 386 and the stator even though the rotor core 380 is constructed to dampen vibrations. Moreover, the concentricity of the inner and outer members 370, 372 may be very accurately maintained in the manufacture of the rotor 386.

Vibration dampening rotor laminations 622 and 622' shown in FIGS. 12 and 13 of a seventh embodiment are similar to the vibration dampening rotor laminations (322, 422, 522) of the fourth through sixth embodiments in that they each include a radially inner member 670 and a radially outer member 672 defining an opening 676 including narrow portions 676A and wide portions 676B. The rotor laminations 622, 622' of the seventh embodiment may also be formed with one or more permanent magnet retaining formations (not shown). The rotor lamination 622 shown in FIG. 12 has elongate segments 674 extending between and interconnecting the radially inner and outer members 670, 672. The elongate segments 674 are tapered away from their intersections with the inner and outer members 670, 672 to increase flexibility while maintaining strength. The rotor lamination 622' of FIG. 13 is similar to the rotor lamination 522 of FIG. 11 in that there are no elongate segments 674 or other structures interconnecting the radially inner and outer members. The rotor lamination 622' of FIG. 13 is identical in construction to the rotor lamination 622 of FIG. 12 except for the absence of the elongate segments 674.

The elongate segments 674 of the rotor laminations 622 are straight, not curved like the elongate segments 374, 474 of the fourth and fifth embodiments, and therefore tend to be somewhat more rigid than the rotor laminations 322, 422 having curved elongate segments. It is therefore more desirable to form a rotor core (not shown) by breaking away the elongate segments 674 of a predetermined number of the rotor laminations 622 in the stack to produce a stack of greater flexibility. Breaking of the elongate segments 674 may be is carried out as the rotor laminations 622 are being stacked in the rotor die, or in another suitable manner. The wide portions 676B of the openings having no elongate segments 674 are aligned in the rotor core to form passages for receiving elastomeric inserts (not shown, but substantially identical to elastomeric inserts 384).

Referring now to FIG. 15, a counterbalance rotor lamination 722 of an eighth embodiment is shown to comprise a disk portion 742 having a generally central shaft-receiving opening 74D therein. There are also three additional openings 790 in the rotor lamination 722 which are spaced radially outwardly from the shaft-receiving opening 740. All additional openings 790 of the rotor lamination 722 are disposed in an arrangement which is asymmetrical with respect to the center C of the shaft-receiving opening 740. Thus, for the additional openings 790 there will not be a corresponding set of openings on the diametrically opposite side of the center C of the shaft-receiving opening. It should be understood that the opening 228 defined by the permanent magnet retaining formation 230 of the rotor lamination 222 of the third embodiment (FIG. 6) may be said to constitute an "additional opening" which is arranged asymmetrically with respect to the center C of the shaft-receiving opening 240 of the lamination. Moreover, it is contemplated that the counterbalance rotor lamination 722 could further include permanent magnet retaining formations (not shown) disposed radially outwardly of the disk portion 742.

The openings 790 are preferably shaped so as to maximize the unbalance of the counterbalance rotor lamination 722, while maintaining the needed magnetic performance capability of the lamination. Unbalance is achieved by removing as much material as possible from one half of the rotor lamination 722. However, magnetic rotor lamination material is needed to conduct flux from the poles of the permanent magnets 726 mounted on a rotor 720 (FIG. 2). The permanent magnets 726 have been shown in phantom in FIG. 15 to illustrate the relationship between the position of poles 726A of the permanent magnets and the openings 790 when the rotor lamination 722 is incorporated into the rotor 720. The flux density of the magnetic field of the permanent magnets is greatest at its poles 726A and decreases toward the middle of the magnet. The flux collecting characteristic of the rotor lamination material is most needed at the poles 726A of the permanent magnets, but not as necessary away from the poles.

In that regard, the openings 790 have radially outer edges 790A extending between laterally opposite ends 790B of the openings. The outer edge 790A of each opening 790 is spaced radially inwardly of the outer peripheral edge of the rotor lamination 722 at at least one of the lateral ends 790B and moves closer to the outer peripheral edge away from the one lateral end toward the opposite lateral end. As may be seen in FIG. 15, the middle of the three openings 790 generally underlies one of the permanent magnets 726 and has an outer edge 790A which is spaced away from the outer peripheral edge of the rotor lamination 722 at both lateral ends 790B adjacent the poles 726A of the permanent magnet. The other two openings 790 each underlie only about one half of one of the permanent magnets 726 and are shaped generally as one half of the middle opening. Thus, it may be seen that the shape of the openings 790 leaves more rotor lamination material adjacent the poles 726A of the permanent magnets than it does in the middle. In this way, as much material as possible is removed while retaining the magnetic function of the rotor lamination 722.

It is to be understood that although the poles 726A are illustrated as coinciding with the physical ends of the magnets 726, such a relationship is not required. In some rotors (not shown) the magnetic poles of the permanent magnets do not correspond with the physical ends of the pieces of magnetic material forming the permanent magnet. In that event, the openings 790 are positioned so that additional material is located adjacent the poles of the permanent magnets, but not physical ends of the pieces of material forming the permanent magnets.

The counterbalance rotor lamination 722 is constructed so that its center of mass is spaced from an axis perpendicular to the rotor lamination which passes through the center C of the shaft-receiving opening 740 of the lamination. Thus, the counterbalance rotor lamination 722 is unbalanced in rotation about the axis which is generally coincident with the axis of rotation of the rotor 720 (FIG. 2) including the counter-balance rotor laminations. The rotor 720, so constructed, is out of balance in rotation an amount predetermined to counter-balance the unbalance rotation of a shaft 738 to which it is connected. The alternative designations 20, 720, and 38, 738 appearing in FIG. 2 indicate that, for purposes of this description, either the rotor 20 shown in FIG. 1 may be incorporated into the compressor motor 48 or the unbalanced rotor 720. The rotor 720 may be substantially identical to the rotor 20 with counterbalance rotor laminations 722 substituting for some of the second rotor laminations 24. The counterbalance rotor lamination 722, like those of the prior embodiments, may be formed by removing material from a generally thin web of stock material, such as by stamping out material in a rotor die.

Counterbalance rotor laminations 722 may be used, for example, to balance the unbalanced rotation of a compressor 92 of the hermetic compressor/motor unit generally indicated at 94 in FIG. 2. To achieve balanced rotation of the compressor/motor unit 94 it is necessary to counterbalance the unbalance of the compressor 92. Using well known methods, the desired amount and location of a counterbalance weight may be readily determined. With this information, a rotor core constructed to achieve the needed counterbalance can be made. Generally speaking, the counterbalance rotor laminations 722 are interleaved with balanced rotor laminations (e.g., rotor laminations 22 and 24) to construct the counterbalance rotor core. More specifically, a first number of counterbalance rotations 722 and a second number of balanced rotor laminations 22, 24 are selected. The counterbalance rotor laminations 722 and balanced rotor laminations 22, 24 are stacked in a predetermined order to build a rotor core which is unbalanced by an amount selected to counterbalance the unbalanced rotation of the compressor 94. The selection may be carried out by controlling a rotor die to shift between punching balanced and counterbalance rotor laminations. It is to be understood that the counterbalanced rotor laminations may be interleaved with rotor laminations 222, 322, 422, 622 or conventional rotor laminations (not shown) and still fall within the scope of the present invention.

The rotor core is provided with permanent magnets 726, assembled with the stator 50 and connected to the shaft 738 in an orientation relative to the shaft which counterbalances the unbalanced condition of the shaft. The rotor 720 and stator 50 are mounted on a frame 54. In the illustrated embodiment the compressor 92 and rotor 720 are mounted on the same shaft 738. The compressor unit 94 is then placed inside a shell 96 which is hermetically sealed. It is to be understood that the use of counterbalance rotor laminations 722 is not limited to construction of compressor motors 62.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotor comprising rotor laminations of a magnetically permeable material which are arranged in a stack for forming a rotor core, the rotor laminations including:

first rotor laminations each comprising a disk portion having a generally central shaft-receiving opening therein, ribs extending radially outwardly from the periphery of the disk portion at spaced-apart locations around the circumference of the disk portion and a bridge extending along an arc between adjacent ribs, the bridge and pair of adjacent ribs defining a permanent magnet retaining formation of the rotor lamination for receiving a permanent magnet, the permanent magnet retaining formation being generally aligned with permanent magnet retaining formations of other first rotor laminations in the stack;

second rotor laminations each having a central shaft-receiving opening therein generally aligned with the shaft-receiving openings of the first rotor laminations in the rotor core, the second rotor laminations having a maximum diametrical dimension which is less than the maximum diametrical dimension of the first rotor laminations;

the first rotor laminations and second rotor laminations being of a magnetically permeable material and interleaved in the stack for use in inhibiting flux leakage along the length of the permanent magnet, at least some of the first rotor laminations in the stack having second rotor laminations located on opposite sides thereof.

2. A rotor as set forth in claim 1 in combination with a dynamoelectric machine including:

a plurality of permanent magnets, each being received through corresponding generally aligned permanent magnet retaining formations of the first rotor laminations in the stack;

a stator including a stator core and windings on the stator core capable of being selectively energized, the stator core having a bore in which the rotor core is disposed;

a shaft received through the generally aligned central shaft-receiving openings of the rotor laminations in the rotor core;

a frame supporting the stator, and supporting the shaft and rotor core mounted on the shaft for rotation relative to the stator.

3. The combination as set forth in claim 2 wherein no more than one rotor lamination in four consecutive rotor laminations in the rotor core is a first rotor lamination.

4. The combination as set forth in claim 3 wherein no more than one rotor lamination in five consecutive rotor laminations in the rotor core is a first rotor lamination.

5. The combination as set forth in claim 2 wherein at least some of the second rotor laminations comprise counterbalance rotor laminations, each counterbalance rotor lamination being constructed so that its center of mass is spaced from an axis perpendicular to the counterbalance rotor lamination and passing through the center of the shaft-receiving opening whereby the counterbalance rotor laminations are unbalanced in rotation about the axis.

6. The combination as set forth in claim 2 wherein the disk portions of at least some of the rotor laminations comprise a radially inner member and a radially outer member and elongate segments extending between and connecting the radially inner and outer members of the rotor laminations, the elongate segments being sized for resiliently flexing to permit relative movement between the radially inner member and radially outer member of the rotor lamination, the apparatus further comprising vibration dampening means disposed in the rotor core between the inner and outer members of the disk portions.

7. A method for forming a dynamoelectric machine comprising the steps of:

stamping first rotor laminations from magnetically permeable material, each first rotor lamination including a disk portion having a generally central shaft-receiving opening therein, ribs extending radially outwardly from the periphery of the disk portion at spaced-apart locations around the circumference of the disk portion and a bridge extending along an arc between the ribs, the bridge and ribs defining a permanent magnet retaining formation of the first rotor lamination;

stamping second rotor laminations from magnetically permeable material, each second rotor lamination having a central shaft-receiving opening therein, the second rotor laminations each having a maximum diametrical dimension less than the maximum diametrical dimension of the first rotor laminations;

interleaving the first and second rotor laminations in a predetermined order to form a rotor core with at least some of the first rotor laminations having second rotor laminations located on both sides thereof, the central shaft-receiving openings of the first and second rotor laminations being generally aligned, at least some of the permanent magnet retaining formations of the first rotor laminations in the rotor core being generally in registration.

8. A method as set forth in claim 7 wherein the step of forming the second rotor laminations comprises the step of stamping the second rotor laminations such that the center of mass of at least some of the second rotor laminations is spaced from an axis perpendicular to the second rotor lamination and passing through the center of the shaft-receiving opening of the second rotor lamination.

9. A method as set forth in claim 8 wherein the step of interleaving the first and second rotor laminations in a predetermined order comprises the step of interleaving the second rotor laminations together with the first rotor laminations in an order which produces a rotor core being out of balance in rotation about its axis of rotation an amount selected to counterbalance a driven shaft.

10. A method as set forth in claim 7 wherein the step of forming the rotor laminations comprises the step of stamping a radially inner member of the disk portion of each rotor lamination having the generally central shaft-receiving opening of the rotor lamination therein, a radially outer member of the disk portion generally surrounding the radially inner member and elongate segments extending between and connecting the radially inner and outer members of the rotor laminations, the elongate segments being sized for resiliently flexing to permit relative movement between the radially inner member and radially outer member of the rotor lamination.

11. A method as set forth in claim 7 further comprising the steps of:

inserting permanent magnets into the rotor core, each permanent magnet extending through permanent magnet retaining formations generally in registration in the rotor core;

attaching a shaft to the rotor core to form a rotor;

assembling the rotor in a central bore of a stator having windings thereon selectively energizable for magnetically interacting with the rotor core;

mounting the stator and rotor shaft on a frame.

12. A rotor as set forth in claim 1 wherein no more than one rotor lamination in four consecutive rotor laminations in the rotor core is a first rotor lamination.

13. A rotor as set forth in claim 1 wherein no more than one rotor lamination in five consecutive rotor laminations in the rotor core is a first rotor lamination.

14. A rotor as set forth in claim 1 wherein at least some of the second rotor laminations have first rotor laminations located on both sides thereof.

15. A rotor as set forth in claim 1 wherein at least some of the first rotor laminations have second rotor laminations engaging both sides thereof in the stack.

* * * * *